Nov. 29, 1960     P. B. DOLL ET AL     2,962,386
METHOD OF MAKING IMPERVIOUS CARBON ARTICLES
Filed March 8, 1957
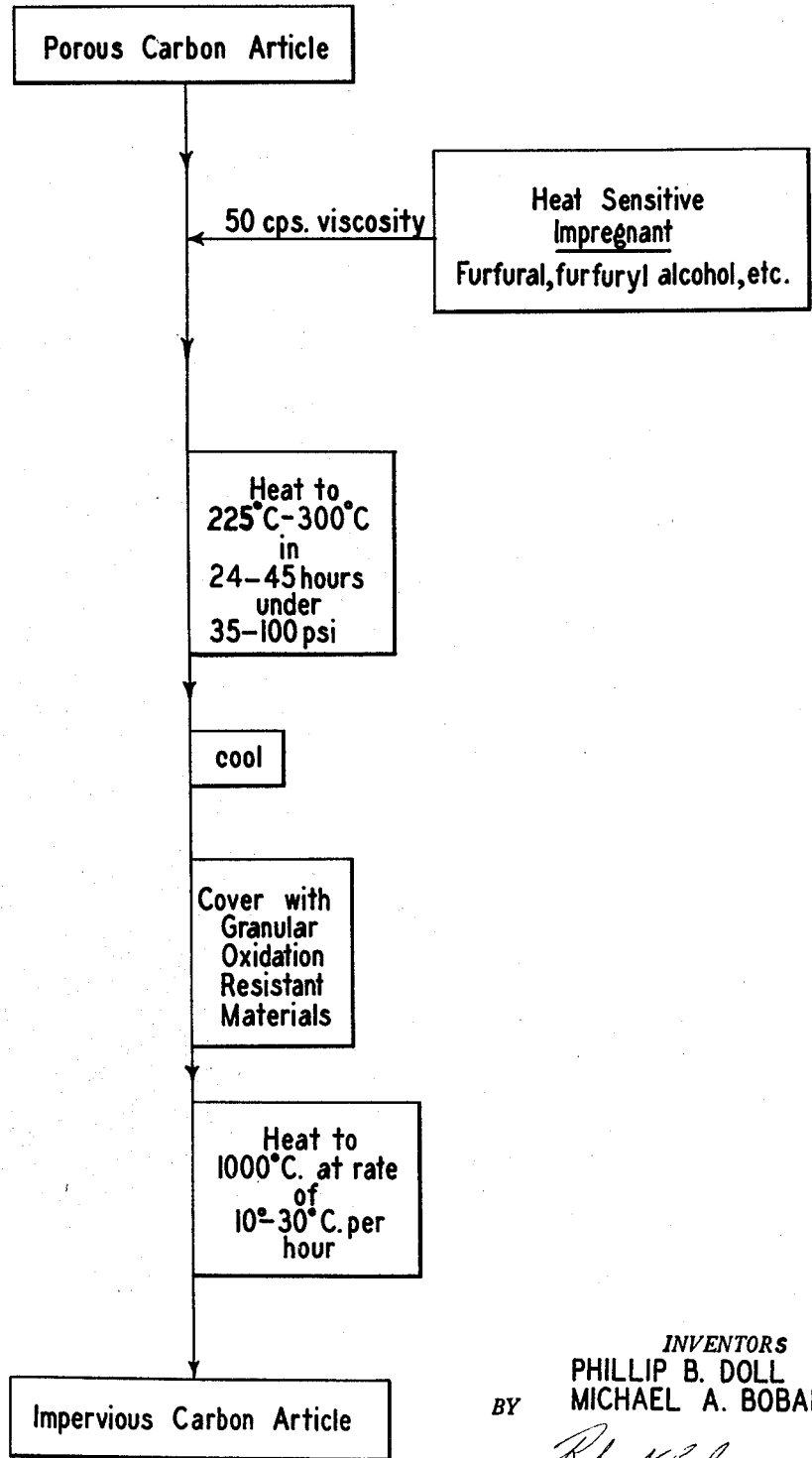
INVENTORS
PHILLIP B. DOLL
BY    MICHAEL A. BOBAL
ATTORNEY

2,962,386

METHOD OF MAKING IMPERVIOUS CARBON ARTICLES

Phillip B. Doll, Lakewood, and Michael A. Bobal, Cleveland, Ohio, assignors to Union Carbide Corporation, a corporation of New York Filed Mar. 8, 1957, Ser. No. 644,709

1 Claim. (Cl. 117—46)

This invention relates to impervious carbon and graphite articles. More particularly this invention relates to an improved method of rendering carbon and graphite articles impervious.

The conventional method of making carbon articles comprises the formation of desired shapes from a mix of carbonaceous material and a volatile binder. The shapes are subsequently baked so that the articles may be handled without deforming. A substantial evolution of the voatile matter occurs during the baking stage leaving the article so produced porous and permeable and therefore not impervious.

The carbon industry recognizing the need for impervious carbon articles had expended large sums of money, and a great amount of time and effort to devise methods of producing carbon articles which are impervious, or at least less pervious to fluids than carbon articles produced by conventional methods. One of the methods in common use today is the impregnation of the pores of the carbon article with organic resins. Such impregnated carbon articles are generally satisfactory, if not utilized under conditions which would subject them to temperatures above about 250° C. More recently improved carbon articles, useful at temperatures well above 250° C., have been developed and a process for making such articles which involves the carbonization of the resin impregnant is disclosed in the copending application of L. L. Winter, Serial No. 644,711, filed concurrently herewith.

Although carbon articles produced by the process disclosed in the Winter application satisfy a long felt need in possessing combined properties of heat resistance, imperviousness, corrosion resistance, and strength, the Winter process, as distinguished from the articles produced by it, suffers from certain disadvantages in quality control which make the production of the final article more costly than is desirable. The difficulties encountered in the utilization of the process are chipping, cracking and spalling of the article being treated unless the article is carefully selected as will be explained below. A high percentage of scrap material is produced by reason of the aforesaid difficulties and an increased degree of care and control is required to utilize the process commercially.

As just indicated in utilizing the process of the Winter application, careful selection of the base carbon material is necessary in order to obtain a high yield of satisfactory product. Thus, the Winter process is most satisfactory when applied to the treatment of relatively small carbon or graphite articles which are free from large voids, laminations or other physical flaws. Articles not possessing the aforesaid properties have a tendency to spall or crack during carbonization of the impregnant in the Winter process.

It is an object of this invention to provide a process by which all types and grades of carbon articles may be rendered impervious without the danger of the articles spalling or cracking during processing.

Another object of this invention is to provide a process by which large sections of carbon and graphite may be rendered impervious.

Another object of this invention is to allow the use of relatively rapid rates of thermal degradation or carbonization of the resin impregnant without the danger of spalling or cracking.

Broadly stated, the process of this invention comprises a method in which all types and grades of carbon and graphite articles are impregnated with a liquid of low viscosity comprising a heat sensitive impregnant, preferably the thermosetting type and in which the impregnated article is heated under super-atmospheric pressure to both cure the impregnant and to effect some decomposition thereof. The article is then heated, under atmospheric pressure as above, to a temperature which is sufficient to further decompose and finally carbonize the impregnant.

The invention will be more readily understood by reference to the accompanying drawing wherein the single figure is a flow diagram illustrating the preferred method of the subject invention. Each step in this process is fully discussed in the paragraphs set forth below.

More specifically, in the practice of this invention a porous carbon article is placed in a suitable vessel and is there brought in contact with the selected impregnant. During this contact period the viscosity of the impregnant is maintained at about 50 centipoises. The impregnant preferably is caused to enter the interstitial passages of the carbon article by the application of super-atmospheric pressure to shorten the impregnation period.

After the article is saturated with impregnant, it is placed in an autoclave and is heated relatively slowly, under pressure, to a temperature of between about 225° C. and 300° C. This heating operation is herein referred to as pressure heating. During the pressure heating and at the lower end of the recited range the resin polymerizes and "sets up," toward the higher temperatures of the recited range, which are higher than the normal curing temperature of the selected impregnant, some decomposition of the impregnant occurs. Since the article has been maintained under pressure, as described above, damage to the article by spalling is avoided not only during the pressure-heating operation but also during the subsequent heating or carbonization stage to be described.

After the impregnated article is subjected to the pressure-heating operation just described it is removed from the autoclave to allow it to cool. To protect the article from oxidation during subsequent baking it is placed in a sagger and covered with a granular material, for instance coke. The sagger and the article contained therein are now heated to a temperature of at least about 1000° C. in order to continue the decomposition of the resinified impregnant and to achieve substantially complete carbonization, in situ, of the residue resulting from such decomposition. A generally satisfactory heating rate is a 10° C. to 30° C. rise per hour.

As has been indicated above, the heat treatment referred to herein as pressure heating is conducted at a temperature above the normal "curing" temperature of the selected impregnant. In this heating operation temperatures in the range of about 225° C. to 300° C. are reached relatively slowly, at least 24 hours being required and preferably 40 to 45 hours. Faster heating rates are suitable for resins of higher solids contents. The pressure applied during this heating operation must be high enough to prevent excessive exudation of the impregnant from the pores of the article but not high enough to unduly impede the desired intumescence of the impregnant. Pressures as low as 35 pounds per square inch have been used satisfactorily but ordinarily pressures in the range of 80 to 100 pounds per square inch are preferred.

During the carbonization stage of the present process, the temperature may be raised to about 1000° C. in 48 hours. However, it has been found that the heating rate is somewhat dependent on the size and shape of the article being heated, thicker sections usually requiring a slower heating rise than smaller, thinner pieces. It has been found that such rates of carbonization are possible without risk of destruction by spalling and cracking of the article in accordance with this invention, presumably because the pressure-heating cycle is more effective because it is carried beyond the normal resin-curing temperatures.

Typical examples of the type of impregnants which may be utilized in the present process are furan-ketone condensation products, such as a mixture of hydrogenated mono- and difurfural acetones; furfural; furfuryl alcohol; phenolaldehyde condensation products, such as phenolformaldehyde; urea-aldehyde condensation products; epoxy resins such as polyglycidyl ethers of polyhydric phenols and dextrose, an acid hydrolyzed starch. However, any impregnant which has a tendency to intumesce above its curing temperature and which may be carbonized on heating at elevated temperatures may be utilized in the present process.

Although a substantial and useful reduction in permeability of an article is achieved in one treatment, as described, it is more usual that one of more additional cycles may be required to achieve complete imperviousness.

The process of this invention has been tested thoroughly by application to a wide variety of starting materials utilizing, in different tests, different impregnants. Many tests have been conducted utilizing commercial equipment and test pieces of commercial size. Typical of procedures conducted on such a scale is that to be described below and in Example I. In the operations there described a number of pipe sections of a selected type were used in a single test and carried through the test as a lot or unit of which there were four lots of different grades. In each test, the pipe sections, after determination of their average porosity and average initial apparent density, were weighed as a unit, impregnated as described, pressure heated, weighed, carbonized, and weighed again. The percentage incremental weight gains observed after each operation are set forth in Table I.

EXAMPLE I

Carbon and graphite pipe sections ⅞ of an inch I.D.x1¼ of an inch O.D.x10 inches long, were placed in an autoclave. The chamber of the autoclave was evacuated for 30 minutes to a pressure below 5 millimeters of mercury. A liquid comprising a mixture of hydrogenated mono- and difurfural acetones and containing 8 percent neutral diethylsulfate was drawn into the evacuated chamber. When the pipe sections were completely covered with resin the vacuum valve was opened and 80 to 100 pounds per square inch of air-pressure were applied for 1 hour. At the conclusion of this impregnation period the resin was removed from the autoclave and the impregnated pipe sections were pressure heated to 250° C., under about 80 to 100 pounds per square inch of air pressure. The pressure-heating schedule was as follows:

Raised 25° C. to 75° C. in 1 hour, held at 75° C. for 18 hours;
Raised 75° C. to 150° C. in 2 hours, held at 150° C. for 3 hours;
Raised 150° C. to 200° C. in 1 hour, held at 200° C. for 6 hours;
Raised 200° C. to 250° C. in 6 hours, held at 250° C. for 6 hours.

After the pressure-heating stage of the process was complete the impregnated pipe sections were removed from the autoclave and allowed to cool. To protect the pipe sections from oxidation, they were placed in a sagger and covered with coke. The sagger containing the impregnated pipe sections was heated to 1000° C., in 48 hours, to carbonize the impregnant within the interstitial passages of the pipe sections. The pipe sections processed in accordance to the aforesaid treatment were tested and retreated until they were found to be impervious when subjected to 50 pounds per square inch of air pressure.

Data observed during processing in accordance with Example I just described are presented in Table I below. As above indicated, the data show the percentage incremental weight gain of the material being tested after pressure heating and the carbonizing operation. Also set forth in the table are the observed porosities of the pipe sections to be treated. These porosities were determined by the mercury porosimeter method of H. L. Retter and L. C. Drake outlined in "Industrial and Engineering Chemistry," Analytical Edition, pages 782–791, volume 17, 1945.

Table I

| Pipe Grade No. | Type Pipe | Before Treatment | | No. of Treatments | Percent Incremental Weight, Gain | | After Treatments Are Complete, Apparent Density |
|---|---|---|---|---|---|---|---|
| | | Apparent Density | Total Percent Porosity | | After The Pressure-Heating Stage | After The Carbonization Stage | |
| 1 | carbon | 1.70 | 15.7 | 1 | 6.3 | 3.3 | |
| | | | | 2 | 0.5 | 0.3 | 1.76 |
| 2 | graphite | 1.69 | 22.0 | 1 | 8.8 | 4.8 | |
| | | | | 3 | 0.2 | 0.1 | |
| | | | | 5 | 0.2 | 0.1 | 1.79 |
| 3 | do | 1.68 | 20.8 | 1 | 8.4 | 4.3 | |
| | | | | 3 | 0.8 | 0.4 | |
| | | | | 6 | 0.1 | ¹0.05 | |
| | | | | 9 | 0.2 | ¹0.01 | 1.82 |
| 4 | do | 1.64 | 19.7 | 1 | 10.6 | 5.5 | |
| | | | | 4 | 2.3 | 1.5 | |
| | | | | 9 | 0.3 | 0.1 | |
| | | | | 13 | ¹0.05 | ¹0.02 | 1.85 |

¹ Approximation.

From Table I it can be seen that the amount of carbon deposited by a single treatment decreases as the article is subjected to an increasing number of treatments, in an exceptional case where a greater pickup is encountered in a successive single treatment it is due to the fact that the exterior of the pipe was purposely abraded with sandpaper before reimpregnation in order to insure maximum penetration of the resin. It is also evident from the data in the table that the process of this invention is applicable to a variety of materials, whether of relatively low or high density or relatively low or high porosity. By repetitive cycles of impregnation, pressure-heating and carbonization, impervious articles can be prepared from porous starting materials.

By the utilization of the present process it has been found that impervious carbon articles of any type may be made from any grade of stock, extruded or molded, hollow or solid, without spalling or cracking of the article during processing. It has also been found that the size of the article does not impede the successful application of this process; carbon articles with circular cross sections up to 42 inches in diameter are presently being successfully processed by this invention. The present process is attractive commercially because poorer grades of stock rendered impervious by the present process generally possess greater strength after treatment and the present process makes possible the production of carbon articles in a routine manner without excessive scrap loss.

What is claimed is:

A method of reducing the permeability of porous, large-sized carbon articles, comprising impregnating said articles with a heat-sensitive impregnant selected from the group consisting of furfural, furfuryl alcohol, phenol-aldehyde condensation products, furan-ketone condensation products, epoxy resins and urea formaldehyde condensation products, said impregnant being maintained at a viscosity of about 50 centipoises while in contact with said articles; heating said articles to a temperature in the range of about 225° C. to about 300° C. during a heating a period ranging from about 24 to about 45 hours under a pressure ranging from about 35 to about 100 pounds per square inch to polymerize, cure, and at least partially degrade said impregnant; cooling the heated articles; placing the cooled articles in a sagger; covering the articles with granular oxidation-resistant materials; and then gradually heating said impregnated articles at a rate of 10° C. to 30° C. rise per hour under non-oxidizing conditions to a final temperature of about 1000° C. to carbonize the residue produced in the pores of said carbon articles by said first heating stage.

References Cited in the file of this patent

UNITED STATES PATENTS

| 490,954 | Edison | Jan. 31, 1893 |
| 916,905 | Whitney | Mar. 30, 1909 |
| 942,852 | Boekeland | Dec. 7, 1909 |
| 1,014,882 | Jones | Jan. 16, 1912 |
| 1,556,990 | Henry | Oct. 13, 1925 |
| 1,620,940 | Bleecker | Mar. 15, 1927 |
| 1,804,052 | Haas | May 5, 1931 |
| 2,066,176 | Girvin et al. | Dec. 29, 1936 |
| 2,087,724 | Sanders | July 20, 1937 |
| 2,174,887 | Kiefer | Oct. 3, 1939 |
| 2,224,724 | Elsey | Dec. 10, 1940 |

FOREIGN PATENTS

| 757,883 | Great Britain | Sept. 26, 1956 |

UNITED STATES PATENT OFFICE

CERTIFICATION OF CORRECTION

Patent No. 2,962,386 November 29, 1960

Phillip B. Doll et al.

It is hereby certified that error appears in the above numbered patent requiring correction and that the said Letters Patent should read as corrected below.

Column 5, line 28, strike out "a".

Signed and sealed this 13th day of June 1961.

(SEAL)
Attest:

ERNEST W. SWIDER
Attesting Officer

DAVID L. LADD
Commissioner of Patents